Sept. 3, 1929. R. H. BROWN 1,726,609
CHILD'S COLLAPSIBLE VEHICLE
Filed Sept. 29, 1928 2 Sheets-Sheet 2
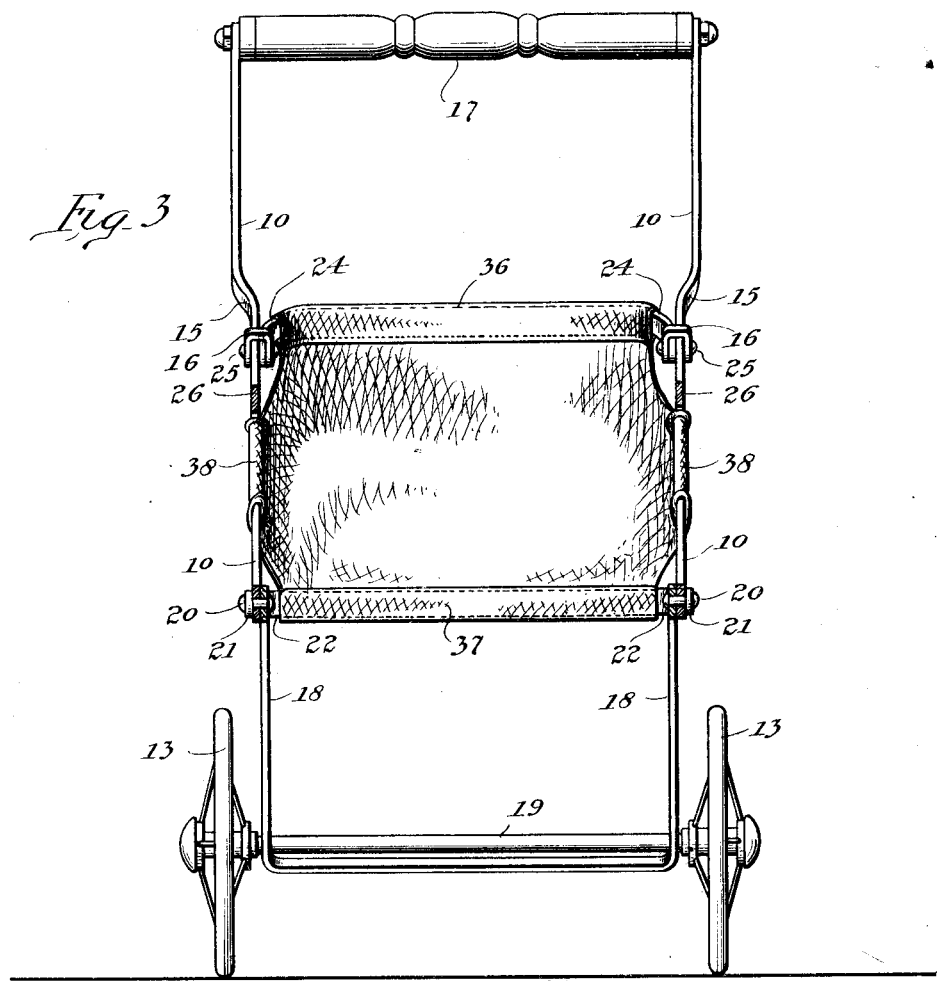
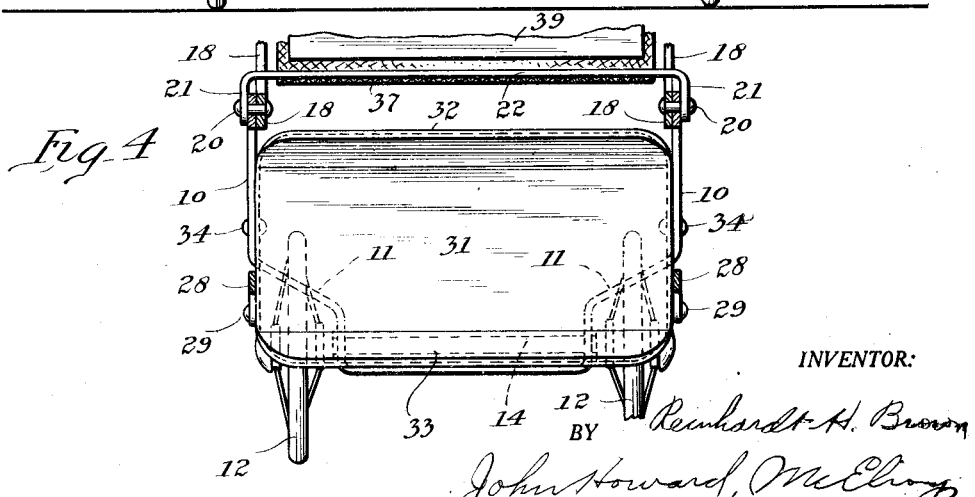
INVENTOR:
Reinhardt H. Brown
BY John Howard McElroy
his ATTORNEY Patented Sept. 3, 1929.

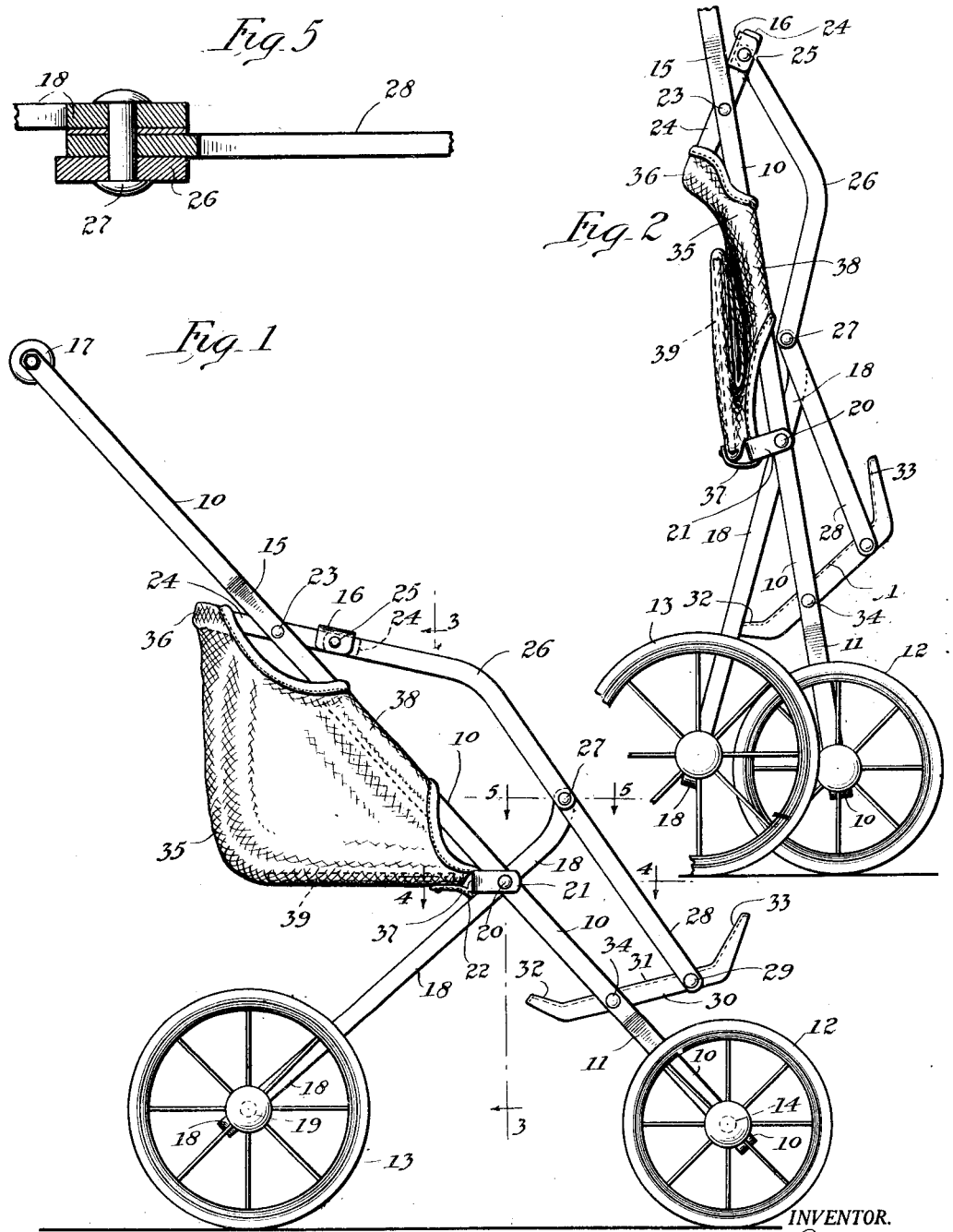

1,726,609

UNITED STATES PATENT OFFICE.

REINHARDT H. BROWN, OF LA PORTE, INDIANA, ASSIGNOR TO JOHN HOWARD McELROY, TRUSTEE.

CHILD'S COLLAPSIBLE VEHICLE.

Application filed September 29, 1928. Serial No. 309,240.

My invention is concerned with children's collapsible vehicles, and is designed to produce an extremely simple, four-wheel device in which the child can be seated with its feet on the foot rest, and which can be readily collapsed so as to occupy a small space for transportation.

To illustrate my invention, I annex hereto two sheets of drawings, in which the same reference characters are used to designate identical parts in all the figures, of which,—

Fig. 1 is a side elevation of the vehicle erected and ready for occupancy by the child;

Fig. 2 is a side elevation showing the vehicle collapsed;

Fig. 3 is a front elevation, in vertical section, on the line 3—3 of Fig. 1;

Fig. 4 is a top plan view in section on the line 4—4 of Fig. 1; and

Fig. 5 is an enlarged detail in section on the line 5—5 of Fig. 1.

In carrying out my invention in its preferred form, I employ a front-wheel frame 10, generally U-shaped in its outline, and formed of a flat metal strip. The extreme lower end is preferably narrowed by the offsets 11, which serve to bring the front wheels 12 between the rear wheels 13 when the parts are collapsed, as seen in Fig. 2. The lower end has secured therein the transverse front axle 14, which has the front wheels 12 journaled on the outer ends thereof. The frame 10 also has the offsets 15 widening the upper portion thereof and permitting the parts to collapse more completely than they would otherwise, since they permit the U-shaped locking pieces 16, to be subsequently described, entering the plane of the front-wheel frame 10 when the parts are collapsed. The otherwise open end of the front wheel frame 10 is closed by the handle 17 secured therein in the customary manner.

The rear-wheel frame 18 is preferably U-shaped and likewise formed of a flat metal strip, and has the rear-wheel axle 19 secured in the lower end thereof, the rear wheels 13, of course, being journaled on the ends of the axle.

The front and rear wheel frames cross each other and are pivotally connected by the rivets 20, which also pass through the ears 21 turned up from the transverse bar 22, which extends between the front and rear wheel frames to the rear thereof, as seen in Fig. 1, so that it serves to prevent the front and rear wheels from separating more widely in the erected position. The front wheel-frame has pivoted thereto by the pivots 23 the shallow U-shaped back-rest frame 24, the forward open end of which is pivotally connected by the pivots 25 with the connecting frame 26, consisting of a pair of bars having their lower ends pivotally connected by the pivots 27 with the upper end of the rear-wheel frame. The U-shaped locking pieces have the rivets 25 passing through them, and it will be obvious that they serve to prevent the back-rest frame 24 and the upper end of the connecting frame 26 from collapsing downward at their junction when the vehicle is erected. Pivoted to the same pivots 27 is the pair of links 28, the lower ends of which are connected by the pivots 29 to the turned down ends 30 of the flat metal foot-rest 31, which preferably has the upturned rear portion 32 and the upturned front portion 33. The downturned ends 30 of the foot rest 31 are also connected by pivots 34 with the front-wheel frame 10.

The flexible body portion 35 may be made of canvas or any other suitable material, and has its upper end supported by the loop 36 on the transverse portion of the back-rest frame 24, while its lower end is connected by the loop 37 with the transverse bar 22. The sides are preferably connected by the loops 38 with the front-wheel frame 10, so that the body portion is thoroughly supported on all sides. In order to form a flatter seat, I preferably insert in the bottom of the flexible body 35, between adjacent layers of the fabric, a rectangular board 39.

The operation of the device will be readily apparent. When it is erected, as shown in Fig. 1, it forms a comfortable seat and back rest for the child, who sits with his feet on the foot rest 31. When it is desired to carry the vehicle, all that is necessary is to lift up on the connecting frame 26 at the joint 25, when the parts will assume the position shown in Fig. 2, in which it can be readily transported by the handle 17.

While I have shown and described my invention as embodied in the form which I at present consider best adapted to carry out its purposes, it will be understood that it is capable of modification, and that I do not desire to be limited in the interpretation of the following claims except as may be necessitated by the state of the prior art.

What I claim as new, and desire to secure by Letters Patent of the United States, is:

1. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, and links pivotally connecting the upper end of the rear wheel frame and the foot rest.

2. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, and means for limiting the distance the bottoms of the wheel frames can separate when the carriage is erected.

3. In a device of the class described, the combination with a front-wheel frame, of a rear wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear wheel frame and the foot rest, and means for limiting the distance the bottoms of the wheel frames can separate when the carriage is erected, said means consisting of a transverse bar pivoted by ears at its ends to the wheel frames where they are pivoted to each other.

4. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, and means for limiting the distance the bottoms of the wheel frames can separate when the carriage is erected, said means consisting of a pair of U-shaped locking pieces embracing and pivoted to the adjacent ends of the back rest and connecting frame where they are pivotally connected.

5. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, and means for limiting the distance the bottoms of the wheel frames can separate when the carriage is erected, said means consisting of a transverse bar pivoted by ears at its ends to the wheel frames where they are pivoted to each other, together with a pair of U-shaped locking pieces embracing and pivoted to the adjacent ends of the back rest and connecting frame where they are pivotally connected.

6. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, means for limiting the distance the bottoms of the wheel frames can separate when the carriage is erected, said means consisting of a transverse bar pivoted by ears at its ends to the wheel frames where they are pivoted to each other, and a flexible body supported at its upper end by the back-rest frame and at its lower end by the transverse bar.

7. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, means for limiting the distance the bottoms of the wheel frames can separate when the carriage is erected, said means consisting of a transverse bar pivoted by ears at its ends to the wheel frames where they are pivoted to each other, and a flexible body supported at its upper end by the back-rest frame and at its lower end by the transverse bar and at its sides by the front-wheel frame.

8. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, links pivotally connecting the upper end of the rear-wheel frame and the foot rest, means for limiting the distance the bottoms of the wheel frames can separate when the carriage is erected, said means consisting of a transverse bar pivoted by ears at its ends to the wheel frames where they are pivoted to each other, and a flexible body supported at its upper end by the back-rest frame and at its lower end by the transverse bar and at its sides by the front-wheel frame, said body having a rigid pad in its lower end to form a seat.

9. In a device of the class described, the combination with a front-wheel frame, of a rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, and links pivotally connecting the upper end of the rear-wheel frame and the foot rest, said foot rest consisting of a generally rectangular plate having its front and rear edges turned up and its edges turned down at right angles to form bearings for the pivots.

10. In a device of the class described, the combination with a generally U-shaped front-wheel frame having a handle closing its otherwise open upper end, of a generally U-shaped rear-wheel frame pivoted thereto, a generally U-shaped back-rest frame pivoted to the front-wheel frame toward the upper end thereof, a foot rest pivoted to the front-wheel frame toward its lower end, a connecting frame pivoted at its upper end to the open end of the back-rest frame and at its lower end to the upper end of the rear-wheel frame, and links pivotally connecting the upper end of the rear-wheel frame and the foot rest.

11. In a device of the class described, the combination with a front-wheel frame, of a rear-wheel frame pivoted thereto, a generally U-shaped back-rest frame pivoted to the front-wheel frame toward the upper end thereof, a foot rest on the front-wheel frame toward its lower end, and a connecting frame pivoted at its upper end to the open end of the back-rest frame and at its lower end to the upper end of the rear-wheel frame.

In witness whereof, I have hereunto set my hand this 27th day of September, 1928.

REINHARDT H. BROWN.